United States Patent Office 3,110,038
Patented Nov. 12, 1963

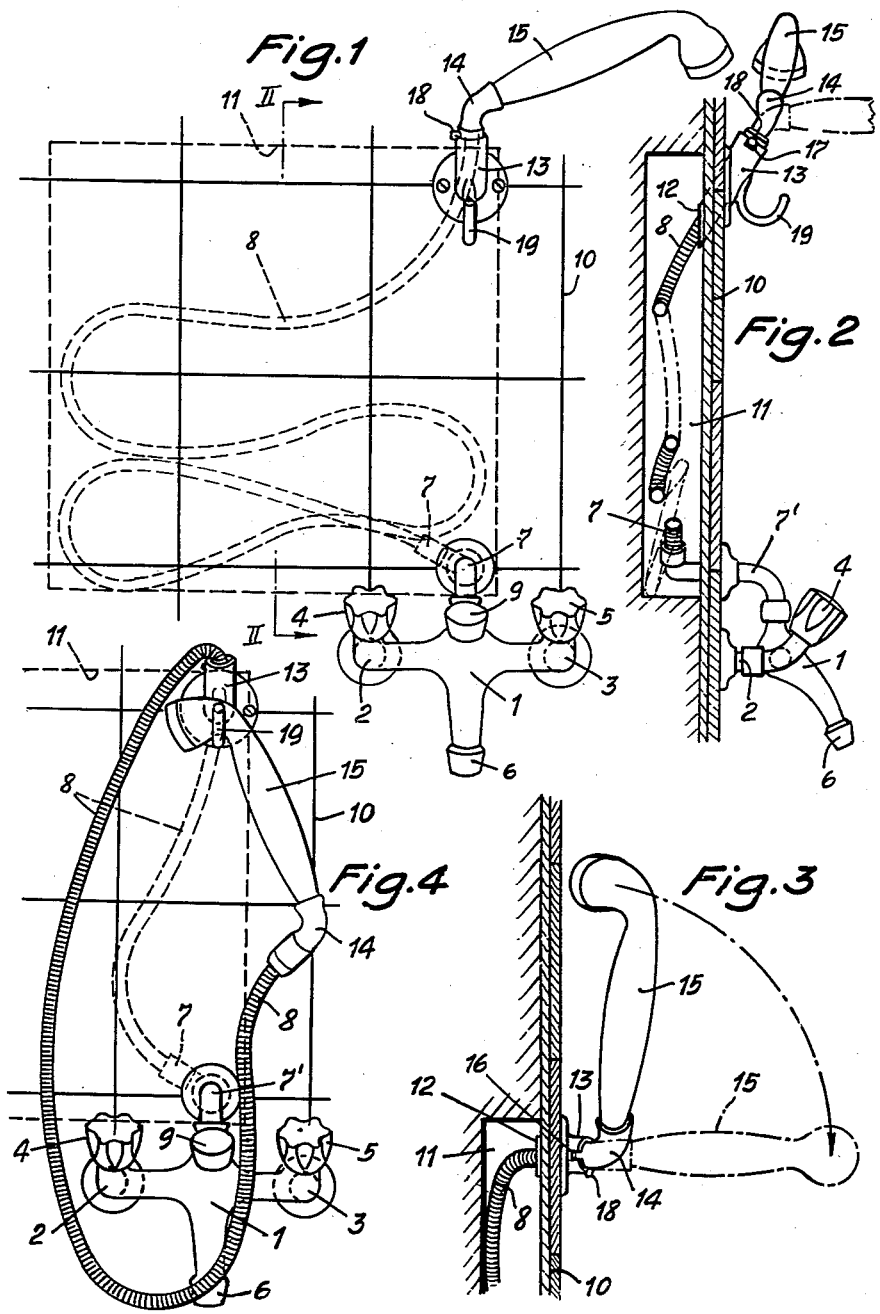

3,110,038
MIXING-FAUCET ASSEMBLY
Fritz Dornbierer, Kesselhaldenstr. 37,
St. Gallen, Switzerland
Filed Aug. 3, 1962, Ser. No. 214,749
1 Claim. (Cl. 4—145)

It is known to provide sinks with a supply metal hose simply passed through a vertical hole and in the plugged state hanging underneath the sink. For bathrooms, however, such known construction is unsuitable.

The present invention relates to a sink or tub mixing-faucet assembly with a flexible supply hose, in particular for toilet and bath rooms. This faucet assembly as disclosed by the invention is distinguished by the fact that the metal hose is passed through a closed hollow space and is disposed therein invisible so as to be insertable and withdrawable. A further feature of my present invention is that a bushing opens into said hollow space, through which the metal hose passes to the outside and which is provided with means for suspending and holding the free supply end or a water delivery means of the metal hose connected thereto, in different angular positions.

One form of my invention is shown in the drawing, in which

FIG. 1 is an elevation of the mixing-faucet assembly with spray mount and spray in the position of non-use, FIG. 2 shows a cross-section on the line II—II of FIG. 1, FIG. 3 is a partial top plan view of FIG. 2, and FIG. 4 is a view similar to FIG. 1, but in which the spray is suspended and the hose is drawn out.

Numeral 1 denotes a mixing-faucet of which the cold and hot-water supplies 2 and 3 are provided with faucets 4 and 5. Water flowing to the outlet 6 or, respectively, to the union 7 of the flexible hose 8 is controlled by depressing or withdrawing a slider knob 9. Union 7 for hose 8 comprises an elbow 7' which passes through the tiling or wall lining 10 and projects into a hollow space 11 recessed behind lining 10 in the masonry. The point of passage of elbow 7' is situated in a lower corner of the rectangular hollow space 11, while in the superjacent corner the bushing 12 of the supply or spray mount 13 traverses the lining 10 at an angle of approximately 60° rising from the inside to the outside. Spray mount 13 forms a socket for the hose connection 14 of spray 15. The orifice rim of the socket of mount 13 comprises two notches 16, 17 offset by an angle of 90° with respect to each other, and hose connection 14 comprises a stud 18 which is engageable in notch 17 in the position of non-use of the spray and in notch 16 in the position of use.

In FIGS. 1 to 3 spray 15 is in the position of non-use on mount 13, in which stud 18 is positioned in notch 17. The position of use of the spray, in which spray 15 stands inclined to lining 10, is shown in FIGS. 2 and 3 in dot-and-dash lines. The spray jet in such case is directed towards the midpoint of the tub (not shown). The spray is locked in its position of use by the engagement of stud 18 in notch 16 of mount 13. By lifting spray 15 from its mount 13, with simultaneous positive withdrawal of hose 8 from hollow space 11, the spray may be used in a mobile way and manner. On spray head 13 is provided a hook 19 for taking up spray 15 when not in use, with hose 8 being pulled out more or less.

The upwardly inclined position of union 7 allows of properly folding the metal hose in serpentines when shoving same into hollow space 11, as shown in dash-lines in FIG. 1. Such folding of the hose also assures an uninterrupted withdrawal thereof, which is of particular importance as the hose may be very easily damaged in the case of checking and jamming when being pulled out. Obviously another outlet means such as a nozzle may be mounted on the free end of the metal hose in place of the spray. The hollow space could be formed into a unit ready to be built-in together with the mixing-faucet assembly.

Spray mount 13, could of course, be offset from 8 to 16 inches to the left or right instead of being disposed perpendicularly above mixing faucet 1, which in certain cases is of advantage for the freedom of motion of persons using the assembly or being active about same.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claim.

What I claim as new and desire to secure by Letters Patent, is:

An assembly of the character described, comprising in combination, a wall adjacent a bathtub, said wall having a recess therein, a mixing-faucet having a supplemental outlet into said recess adjacent a lower corner thereof, a flexible extensible metal rose connected to said outlet, a closure panel for said recess, a fitting adjacent an upper corner of said recess, said fitting comprising an upwardly inclined bushing extending through said panel and having an upwardly extending tubular spray mount exteriorly of said recess, means forming notches at the upper periphery of said tubular spray mount, a hook on the underside of said tubular portion, said flexible tube extending through said bushing on said tubular spray mount, a tubular hose connection on the outer end of said hose insertable into said tubular spray mount when said hose is retracted into said recess, an angularly offset spray head connected to said hose connection, an angularly offset spray nozzle at the end of said spray head, and a stud on said hose connection engageable in a notch for holding said spray head and nozzle in a selected position of angular adjustment when said hose is retracted, said spray head being engageable by said hook in a position to be supported thereby with said hose in extended condition.

References Cited in the file of this patent
UNITED STATES PATENTS

| 824,454 | Vanderman | June 26, 1906 |
| 2,697,839 | Jackson | Dec. 28, 1954 |
| 2,903,710 | Pearson | Sept. 15, 1959 |

FOREIGN PATENTS

| 459,502 | Great Britain | Jan. 8, 1937 |